…

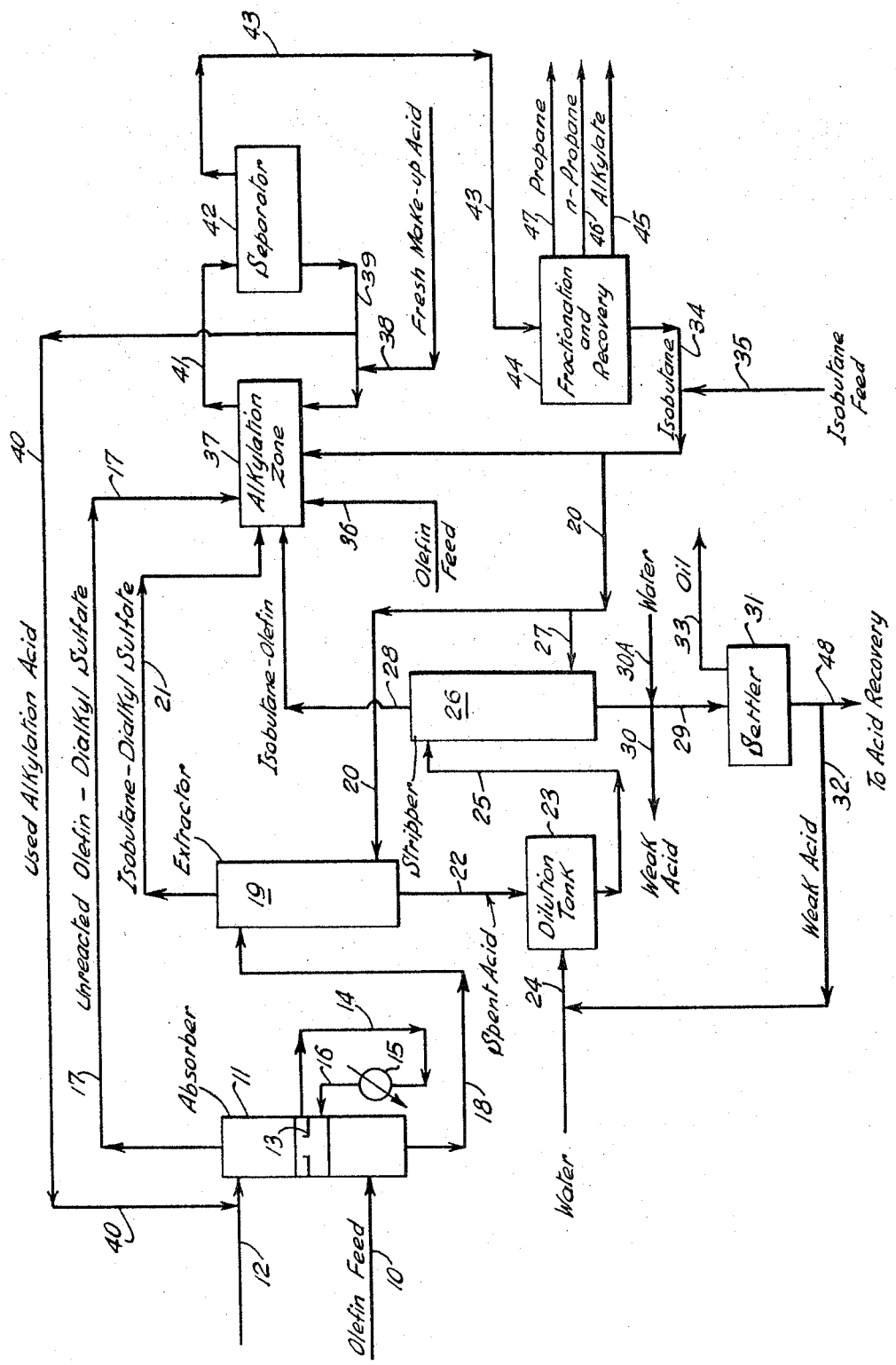

United States Patent Office 3,462,512
Patented Aug. 19, 1969

3,462,512
RECOVERY OF OLEFINS FROM SPENT ALKYLATION ACID
Arthur E. Goldsby, Chappaqua, N.Y., assignor to Texaco Development Corporation, New York, N.Y., a corporation of Delaware
Continuation-in-part of application Ser. No. 516,448, Dec. 27, 1965. This application Feb. 12, 1968, Ser. No. 704,933
Int. Cl. C07c 3/54, 7/00
U.S. Cl. 260—683.62      13 Claims

ABSTRACT OF THE DISCLOSURE

Spent sulfuric acid alkylation catalyst in which olefins have been absorbed to form dialkyl sulfates and the dialkyl sulfates extracted therefrom is diluted with water to an equivalent acid concentration of from about 50% to 85%, and additional olefin is recovered from the diluted acid, either by heating or by extraction with isobutane. The recovered olefin may be charged to an alkylation process.

Cross-references to related applications

This application is a continuation-in-part of copending application Ser. No. 516,448, filed Dec. 27, 1965 and now abandoned.

Background of the invention

This invention is directed to improvements in the utilization of sulfuric acid used in the alkylation of olefins or aromatics in the presence of sulfuric acid catalyst. More particularly, it is directed to a method of restoring the catalytic effectiveness of sulfuric acid catalyst by the absorption of olefins therein, extracting dialkyl sulfates thus formed with isobutane from the alkylation contaminants, and alkylating the dialkyl sulfates with release of 100 percent $H_2SO_4$. Only a small percentage of alkyl acid sulfate is removed by extraction with isobutane. The spent acid remaining after extraction of the dialkyl sulfates contains a high percentage of alkyl acid sulfate. This represents a loss of valuable olefins, since the acid is usually sent to conventional acid recovery for burning. In addition, such an acid may have as much as about 35% of hydrocarbon in it and such an acid is not as desirable for acid recovery as one with a lower hydrocarbon content, for example, about 3–10%, by conventional burning processes to give $SO_2$ and ultimately $SO_3$ and $H_2SO_4$. In other words, spent acid would be improved for conventional recovery processes if it had a lower hydrocarbon content.

Summary of the invention

In accordance with my invention, olefin remaining in sulfuric acid after removal of the dialkyl sulfates, present particularly as olefin in alkyl acid sulfate, is recovered from the spent acid by a simple and relatively inexpensive procedure, and made available for alkylation. Spent acid, which usually contains only a small percentage of water, is diluted with sufficient water or weak acid to yield an equivalent acidity of about 50 to 85%. The diluted acid is then either heated to boil off the olefin, or is contacted with isobutane to extract the olefin. The olefin or olefin-isobutane mixture may be sent to an alkylation reaction zone for conversion to alkylate.

An advantage of my invention is that the loss of olefin in alkylation is reduced and the recovered olefin is made available for alkylation. Another advantage is that the organic content of the spent sulfuric acid is substantially reduced, thereby producing an improved acid for conventional acid recovery.

Brief description of the drawings

Having set forth the general nature of the invention, it will be best understood from the more detailed description accompanying the drawing. Although the drawing illustrates an arrangement of apparatus in which the process of this invention may be practiced, it is not intended to limit the invention to the particular apparatus or materials described.

Description of preferred embodiments

Referring to the figure, an olefin feed stock comprising propylene in line 10 is fed near the bottom of absorber 11. Used sulfuric acid alkylation catalyst of about 90% $H_2SO_4$ concentration is passed through lines 40 and 12 to absorber 11. Absorber 11 is operated in the liquid phase at about 60 p.s.i.g., and a temperature of 20–40° F. is maintained by withdrawing a portion of the downflowing liquid from trap tray 13 through line 14, cooler 15 and returning cold liquid to absorber 11 through line 16. Absorber overhead liquid containing unreacted olefin feed and some dissolved dialkyl sulfate is withdrawn through line 17 and passed to alkylation zone 37. The heavy phase of the absorber reaction mixture comprising alkyl acid sulfate, dialkyl sulfate and alkylation contaminants is passed through line 18 to countercurrent extractor 19 near the top. Isobutane from line 20 is passed to extractor 19 near the bottom. The overhead comprising isobutane and dialkyl sulfate substantially free of alkylation contaminants is passed through line 21 to alkylation zone or recator 37. The raffinate or spent acid from extractor 19 is discharged through line 22 to dilution tank 23 together with sufficient water, or dilute acid, introduced through line 24 to reduce the acidity of about 50–85 weight percent $H_2SO_4$. Diluted raffinate is then passed through line 25 to stripping column 26 where it is countercurrently contacted with isobutane introduced through line 27. Olefin is stripped from the diluted raffinate and an effluent isobutane-olefin stream is discharged through line 28 as feed to alkylation zone 37. Weak acid from stripper 26 is discharged through lines 29 and 30, or when it desired to charge weak acid rather than water to dilution tank 23, weak acid from stripper 26 is charged to settler 31 by line 29. Oil is taken off the top of settler 31 through line 33, and weak acid is charged to dilution tank 23 via lines 32 and 24. If necessary, additional water or weak acid can be added through line 30A to the acid in line 29 prior to settler 31, if a lower acidity is desired or required, such as to obtain oil separation in settler 31. Spent acid from line 30 or line 48 is sent to conventional acid recovery, not shown, for burning, or it can be used in chemical manufacture.

The unreacted olefin-dialkyl sulfate stream from absorber 11 in line 17, the isobutane-dialkyl sulfate stream from extractor 19 in line 21, the isobutane-olefin stream from stripper 26 in line 28, and additional isobutane by lines 34 and 35 and additional olefin by line 36 are charged to alkylation zone 37 where the isobutane is alkylated by the olefin. Fresh sulfuric acid of 98.0–99.5% concentration through line 38 and recycle acid of about 90% concentration through line 39 are also charged to alkylation zone 37.

The alkylation reaction mixture is passed through line 41 to separator 42. Acid and hydrocarbon phases are separated in separator 42, the acid phase being recycled to alkylation zone 37 through line 39 and the hydrocarbon effluent being withdrawn through line 43 to conventional fractionation and recovery facility 44. In fractionation and recovery 44 alkylate product is separated and discharged through line 45 for motor fuel or other use. n-Butane and propane are withdrawn through lines 46 and 47, respectively, and isobutane is withdrawn through line 34 for recycle to alkylation zone 37, and also for extractor 19 through lines 34 and 20, and extractor 26 through lines 34, 20 and 27.

Olefin absorber

Various olefins, such as propylene, butylenes and amylenes, and mixtures thereof can be used for reaction with used alkylation acid in the olefin absorber. Secondary olefins such as propylene and n-butylenes are preferred.

It should be emphasized that is is desired to convert as much as possible, preferably at least 80 to 90 percent, of the used sulfuric acid catalyst in the absorption step to dialkyl sulfate. This may be accomplished by using good absorption conditions, including efficient mixing, countercurrent flow, and an excess of olefin in relation to the acid, that is, in excess of two mols of olefin per mol of acid.

The olefin absorption may be carried out in either vapor or liquid phase, or in a combination of the two. For example, part of the absorption may be carried out in the vapor phase, followed by liquid phase for the final portion of the absorption step for a high conversion of the acid to dialkyl sulfates. Cooling in the absorption step may be effected, if desired, by introducing all or a part of the charge, or extraneous hydrocarbons, such as propane, in liquid phase and allowing it to vaporize by the heat of reaction in the absorber. Cooling may also be effected by using charge streams to the absorber cooled to a temperature below the absorber reaction temperature, for example, the used acid catalyst may be supplied from an emulsion flashing alkylation operation. Cooling may also be obtained by indirect heat exchange with cooling coils either in the absorber or outside as shown in the figure.

Used alkylation acid catalyst having a titratable acidity of 88 to 93% by weight and containing only about 2 to 4 percent water is the preferred acid charge stock for the absorption step, although in some cases, for example, if amylenes are being alkylated, it may have a concentration as low as 80 to 85%. Acid from other sources, such as fresh acid, acid from chemical reactions, and acid from the acid treatment of petroleum naphtha or lube oil may also be used.

A short residence time and low temperature are conducive to good results in the absorber and preferred although other factors have a considerable bearing on these variables. The efficiency of contacting of olefin with acid is of course very important. Residence times as short as a few seconds or minutes may be used, if a feed stock is passed through an efficient contacting device. On the other hand, a residence time as long as an hour or longer may be used in a liquid phase reactor, or in a packed countercurrent tower by venting inerts in vapor phase and recycling liquid reaction mixture from near the bottom of the tower to about half way up or higher in the tower.

A temperature range of 30 to 50° F. is satisfactory for propylene although less conjunct polymer is formed at lower temperatures. For n-butylene containing stocks, a temperature of 20 to 40° F. is preferred.

The absorption step can be effected in contacting equipment well known in the art, for example, mixer settlers, centrifugal contactors, countercurrent towers or two or more mechanically stirred reactors operating to give countercurrent flow. Multistage countercurrent contacting is preferred.

Although not a great deal of inerts remains dissolved in the liquid product from the absorber, if desired, the inerts may be removed, for example, by reducing the pressure on the liquid product and venting the evolved gases.

Extraction of the olefin absorber reaction product

Although various methods may be used to separate the dialkyl sulfate from the olefin absorber reaction product, I prefer to extract it with isobutane.

Even though very good extraction conditions are used for this extraction step, it has not been found possible to remove all of the alkyl sulfates. In fact, the spent acid from this extraction step is predominantly alkyl sulfates, and in particular alkyl acid sulfates. A typical analysis of a spent acid when propylene is absorbed in used alkylation acid catalyst comprises 2.5% water, 11.2% acid-polymeric oil, 11.4% diisopropyl sulfate and 74.9% propyl acid sulfate. Diisopropyl sulfate is equivalent to or contains 46.2% of propylene and propyl acid sulfate is equivalent to or contains 30% of propylene.

If one tries to remove the olefin directly from the alkyl sulfates in the spent acid, for example, by raising the temperature, say above about 100° F., polymerization and adverse side reactions occur with the result that most of the olefin is not removed and is converted to materials not suitable for alkylation.

It is the spent acid from this extraction step containing a substantial amount of combined olefin in the form of alkyl sulfates which we treat to recover the olefin and reduce the hydrocarbon content of the acid.

Low temperatures and short times are preferred for the hydrocarbon extraction of the olefin absorber reaction product. For example, a temperature range of 30 to 50° F. with a few minutes residence time is satisfactory. However, good results have been obtained at ambient temperatures as high as 85 to 100° F. The conditions depend somewhat upon the absorption product and the olefin used for the absorption step.

The extraction step may be effected in equipment known in the art, for example, mixer-settlers, centrifugal contactors or countercurrent towers, for example, a rotating disc contactor. Less efficient extraction may be used to accomplish the same results if more water is present in the absorber reaction product as will be disclosed in more detail later.

Dialkyl sulfates are more readily extracted with a hydrocarbon than the alkyl acid sulfates. It is desirable to use conditions in the extraction step so as to extract as much as possible of the dialkyl sulfate and to approach as nearly as possible only acid-oil reaction product and water in the raffinate spent acid phase, with all of the alkyl sulfates in the extract or organic phase. Such conditions include the use of a liquid solvent dosage of the order of six mols per mol of alkyl sulfate, or higher, raffinate recycle, multistage countercurrent extraction, and optimum charge rate for a given extraction vessel. The raffinate or spent acid from the extraction step comprises water, alkyl acid sulfate, dialkyl sulfate and the reaction product of acid and polymeric oil formed during the alkylation and absorption steps. The extract comprises the hydrocarbon solvent, dialkyl sulfate, and a minor amount of alkyl acid sulfate.

The weaker the raffinate acid is in the extraction step, the higher the relative solubility of the polymer oil is in hydrocarbon solvent, or the polymer oil is held less tightly by the acid. Polymeric oil contaminant in the absorber-extractor extract is highly unsaturated and it reacts readily with strong sulfuric acid, such as fresh make-up acid used for the alkylation step, or used alkylation acid catalyst, of about 90% concentration. The polymeric oil then may be removed from the absorber extract by acid treatment prior to charging it to alkylation, and optionally after removal of any excess unreacted olefin. Good results have been obtained by acid treating polymeric oil in isobutane solution with used alkylation acid of about 90% concentration at a temperature of 85° F. and a time as long as one hour in an amount about equal in weight to that of the free oil. However, a temperature not over about 40 to 60° F. and a short time on the order of a few minutes or less are preferred. A very short time such as is obtained by mixing with a pressure drop orifice appears to be satisfactory. To insure substantially complete removal of the oil and also any water present, an excess of acid may be used. If too great an excess of acid is used, some dialkyl sulfate will dissolve in it and be lost from the extract. This is not too serious as the dialkyl sulfate may be reextracted with a hydrocarbon solvent from the separated acid phase. Or when operating in a continuous system, the acid phase may be charged to the main extraction tower. Alternatively to acid treating the extract, the entire absorber reaction product prior to extraction of the dialkyl sulfates may be acid treated to remove the polymeric oil.

Dilution of the spent acid

It has been discovered that if the spent acid from the extraction step is diluted with water or weak sulfuric acid, the combined olefin contained therein can be removed either by heating or by stripping with isobutane, preferably at an elevated temperature, with a minimum of adverse side reactions. In most cases the olefin may be recovered in high yield.

In general enough water or weak sulfuric acid should be added to the spent acid so that the equivalent acidity is reduced to at least about 85%, that is, so that the acidity would be about 85% by weight $H_2SO_4$ if all of the olefin were removed and only the acid and water remained. In other words, considering only the sulfuric acid and water, there should be at least 15% of water present. In some cases good results can be obtained with an equivalent acidity as high as about 90%, or with only about 10% of water present. The equivalent acidity should not be reduced below about 50% or otherwise alcohols rather than olefins will be formed and removed from the acid in the case of some olefins. Alcohols, and also ethers, can be alkylated but they split out undesirable water when alkylated with isobutane. The acidity should not be lowered any more than necessary to achieve the desired result of recovering the olefin, since in general the higher the concentration of the acid the better it is for conventional acid recovery. It should not be necessary to dilute the spent acid so that the final acidity is below about 50%. However, if the acidity is too high, it tends to promote ether formation rather than free olefins, especially at elevated temperatures. Thus, the spent acid should be diluted to an equivalent acidity of about 50–85%, and preferably to about 70–85%.

Water, ice or weak acid may be added with cooling to maintain a relatively low temperature or ambient temperature. However it does not seem to be harmful to let the temperature rise to the desired temperature prior to removing the olefin. Thus, it is advantageous from a heat standpoint to let the temperature rise during the dilution step.

It appears that the main reactions involved are the dialkyl sulfates being converted to alkyl acid sulfates, alkyl acid sulfates being converted to alcohols and olefins, and alcohols being converted to olefins.

Using propylene as the olefin we would have the following reactions:

$$(C_3H_7)_2SO_4 + H_2O \rightleftharpoons C_3H_7HSO_4 + C_3H_7OH$$
$$C_3H_7HSO_4 + H_2O \rightleftharpoons C_3H_7OH + H_2SO_4$$
$$C_3H_7OH \rightleftharpoons H_2SO_4 C_3H_6 + H_2O$$

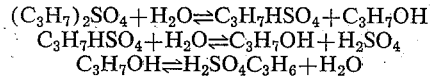

Since the above reactions are equilibrium reactions, reaction conditions are selected which will shift the equilibrium in all cases to the right. Preferably this is done by removing olefin from the diluted acid so that the remaining products from the alkyl sulfates are sulfuric acid and water.

Stripping of olefin from diluted acid

As indicated earlier, the olefin may be removed from the diluted acid leaving sulfuric acid and water either by heating the diluted acid, by stripping the olefin out with isobutane, or by a combination of heating and stripping with isobutane. Heat alone works better for the butylenes than for propylene. When heat alone is used, the simplest procedure is to maintain the mixture at as low as temperature as will give evolution of the olefin. In general as low a temperature as can be used to give the desired yield of olefin is preferred.

Higher yields of olefins can be obtained if a hydrocarbon stripping agent is used. Sufficient time is required for conversion of the alkyl sulfates and alcohols to olefins, and the time can be shortened and the amount of stripping agent reduced if a temperature above about 75° F. is used. A temperature of about 100 to 175° F. is preferred, although in some cases higher temperatures are required. In general, a higher temperature is required with a higher concentration acid. Temperatures on up to the boiling point of the acid can be used. Usually temperatures of not over 320° F. will be required. For orientation, different strengths of sulfuric acid have approximate boiling points, as follows:

| Concentration in weight percent $H_2SO_4$: | Boiling point in ° F. |
|---|---|
| 62.2 | 295 |
| 77.7 | 386 |
| 81.3 | 415 |
| 85.7 | 451 |
| 88.7 | 485 |

Although various hydrocarbon solvents and inert purge gases may be used to strip or extract the absorbed olefin from the diluted sulfuric acid, I have found that the preferred solvent is isobutane. Other solvents, such as propane, n-butane, or normally liquid hydrocarbons, either entail expensive processing steps for removal from the olefin, or are harmful if charged to alkylation along with the olefin. Isobutane is ideal in a number of respects. It has a low molecular weight, may be easily used in either vapor or liquid phase, is readily available in large quantities in the process as described, gives good results, and it need not be separated from the olefin charged to alkylation. In fact it is advantageous to have it admixed with olefin when the olefin is charged to alkylation. An advantageous features of the process is that any particular olefin recovered need not be pure or present in high concentration when used in alkylation.

The stripping can be done with isobutane in the liquid phase or in vapor phase. In vapor phase the possibility of extracting liquid polymeric oil, which is an alkylation contaminant, is eliminated. If liquid phase is used and polymeric oil is extracted, the polymeric oil can be removed from the isobutane-polymeric oil mixture by contacting it with used alkylation acid catalyst.

Although the amount of stripping agent required will depend on factors such as the acid concentration, olefin concentration in acid, temperature, and yield of olefin desired, usually not over 5 liquid volumes of isobutane per liquid volume of olefin in the acid are required.

If the spent acid as shown in the figure from stripper 26 which goes through line 29 to settler 31 is not sufficiently dilute to cause separation of polymeric oil, additional water can be added to cause oil separation. Enough water should be added to give a titratable acidity of about 45–50%, if the acid is substantially free of alkyl acid sulfate. In any case, the minimum water should be added to give substantially complete separation of the oil. After separation of the oil the dilute acid of about 50% by weight of $H_2SO_4$ should be substantially free of hydrocarbon, for example, less than 2% by weight, and preferably less, and thus improved for conventional acid recovery.

When it is desired to have acid substantially free of or low in hydrocarbon, the stripping of olefin, as described earlier, should be conducted under conditions to remove practically all of the olefin, or to convert the olefin to a form which will be acid insoluble when diluted to about 45–50% $H_2SO_4$.

Special case of dilution and extraction

In continuous operation even with efficient countercurrent extraction with isobutane it has been found that approximately 5–10% of the dialkyl sulfate will be in the spent acid, or an appreciable amount of dialkyl sulfate is not extracted when no water is added to the absorption mixture.

It has been found that when water is added to the spent acid or absorber reaction product to cut the equivalent acidity, it unexpectedly makes the dialkyl sulfate less soluble and much easier to extract. It is advantageous to extract substantially all of the dialkyl sulfate from the spent acid prior to converting the mono and dialkyl sulfates to free olefins by diluting to 50–85% equivalent acidity followed by stripping of olefin. This has the advantage of recovering acid in the form of alkyl sulfates as well as recovering olefin from the spent acid. For this purpose the extraction would have to be made in the liquid phase. I prefer isobutane as the solvent. For this particular alternative of removing substantially all of the dialkyl sulfate by extraction prior to converting the alkyl acid sulfate to olefin, or adding at least part of the water and then extracting dialkyl sulfate prior to stripping olefin from the alkyl acid sulfate, it has been found adequate to add just enough water to the spent acid after the bulk of the dialkyl sulfate has been extracted, or to the absorber reaction product to give a final equivalent acidity of about 85–90%. Further dilution of the spent acid makes it even easier to extract the dialkyl sulfate, but it isn't necessary. The minimum amount of water to give the desired results should be used since the system becomes more corrosive and there is more of a tendency to extract polymeric oil as more water is added.

It was found in laboratory work that when 5.7% of water by weight was added to an absorber reaction mixture of propylene and sulfuric acid, with unreacted propylene removed, that as much diisopropyl sulfate could be extracted in a single batch extraction with isopentane as with four batch extractions with isopentane when water was not added; usually about 4 to 7% is the preferred range. In each case essentially all of the diisopropyl sulfate was extracted. In other words, not as much water need be added to extract substantially all of the dialkyl sulfate as to strip out the olefin from alkyl acid sulfate. Thus, essentially all of the dialkyl sulfate can be extracted with isobutane either directly from the absorber reaction mixture, or from the spent acid after 80% or more of the dialkyl sulfate has been extracted, by diluting either the absorber reaction mixture or the spent acid with enough water to give a final equivalent acidity of about 85–90%.

Alkylation

In general the conditions for the alkylation step are those which are well known in the art. However, the bulk of the make-up acid is charged to alkylation as alkyl sulfates which result from the recovery section, and only a minor portion of the acid is charged as the fresh make-up acid of the usual 98.0 to 99.5% concentration. Since the alkyl sulfates are substantially water free, the trend is for the system catalyst, when using the acid recovery process, to be of lower water content and, in general of superior quality in that a lower end point alkylate of higher octane value is obtained. Of course, if desired, less drying of charge stocks may be used, and in such a case the water content of the system catalyst may be as high as in conventional operation without acid recovery. The sulfuric acid in the alkylation system is usually maintained within a range of about 88 to 95% by purging spent acid from the system. In a multiple reactor system, the acid of the lowest concentration is preferably purged and sent to the acid recovery system.

A large excess of isobutane is used in alkylation, for example, as much as 60 to 80 volume percent of the hydrocarbons in the alkylation reaction mixture. Consequently, a large quantity of isobutane must be recovered and recycled for reuse in the alkylation process. It is also available for the recovery process as described, and for the stripping of olefins from diluted spent acid.

In addition to the olefin which is charged to the alkylation step in the form of alkyl sulfates, additional fresh olefin is usually charged to the alkylation step. For example, when propylene is used for the absorption step, it is advantageous to use butylenes in the alkylation step.

Example I

A sample of spent acid of the type obtained after extraction in extractor 19 when charging propylene to absorber 11 comprises:

| | Weight percent |
|---|---|
| Water | 2.5 |
| Polymeric oil | 11.2 |
| Diisopropyl sulfate | 11.4 |
| Propyl acid sulfate | 74.9 |
| | 100.0 |

To 100 grams of a sample of spent acid of the above analysis is added 20 grams of $H_2O$, or enough to give a reduction in the equivalent acidity of 96% down to 72% (28% water–72% $H_2SO_4$), considering only the alkyl sulfates and water, after removal of all olefin in the alkyl sulfates. The diluted sample of acid is heated causing gentle evolution of propylene. The heating is continued for about one hour reaching a final temperature of 310° F. or until the evolution of propylene ceases. The yield of propylene is 15 grams or 54% of theory.

By operating at a lower temperature of 210° F. using isobutane as a stripping medium the yield of propylene is increased to 19 grams or 69% of theory. This corresponds to a reduction in total hydrocarbon content of the acid by approximately 50%, or a reduction from 39% down to about 20% and with about the same weight of acid as before the stripping operation.

EXAMPLE II

A sample of spent acid of the type obtained after extraction in extractor 19 when charging n-butylene to absorber 11 comprises:

| | Weight percent |
|---|---|
| Water | 4.0 |
| Polymeric oil | 8.0 |
| Diisobutyl sulfate | 7.5 |
| Butyl acid sulfate | 80.5 |
| | 100.0 |

To 1000 grams of a sample of spent acid of the above analysis is added 300 grams of $H_2O$, or enough to give a reduction in the equivalent acidity of 93% down to 61%. The diluted sample of acid is contacted in a countercurrent column in the liquid phase with 2640 cc. of isobutane at 180° F. The acid is charged near the top of the column and the isobutane is charged near the bottom of the column. The yield of olefin is 246 grams or 74% of theory. The isobutane-butylene mixture from the top of the countercurrent column is sent to alkylation. This corresponds to a reduction in total hydrocarbon content of about 60%.

Approximately the same yield of butylenes is obtained by heating a sample of diluted spent acid as when isobutane is used above. In batch operation a final temperature of 270° is reached. In continuous operation a temperature of about 240–260° F. is maintained.

EXAMPLE III

An excess of propylene (11.4 parts by weight) was reacted with 8.864 parts by weight of commercial used alkylation catalyst having a titratable acidity of 90.4% and containing 3.0% by weight of water and 2.7% by weight of polymeric oil at 36° F. for 4 hours followed by 15 hours at 77° F. in a stainless steel bomb in the liquid phase under pressure. Unreacted propylene was removed from the reaction mixture by reducing the pressure. The amount of propylene reacted was 7.179 parts by weight, which is 95% of theory based on 90.2% of the acid being 100% $H_2SO_4$ and all of it reacting to form dipropyl sulfate.

Four successive batch extractions with 25 cc. of isopentane at 77° F. were made on the above reaction mixture. The results were as follows:

| | Percent of diisopropyl sulfate extracted |
|---|---|
| 1st extraction | 57.7 |
| 2nd extraction | 20.3 |
| 3rd extraction | 5.0 |
| 4th extraction | 1.5 |
| Total extracted | 84.5 |

EXAMPLE IV

A duplicate run was made in which excess propylene (11.756 parts by weight) was reacted with 9.141 parts by weight of another sample of the same commercial used alkylation catalyst under the same conditions. The amount of propylene reacted was 7.399 parts by weight and again was 95% of theory.

One milliliter of water or 5.7% by weight basis the acid plus reacted propylene was added to the reaction mixture and then it was extracted with 25 cc. of isopentane at 77° F. The amount of diisopropyl sulfate extracted was 85.3%, or essentially the same amount as in Example I with 4 successive extractions.

The above results clearly show the value of adding a small amount of water to the reaction mixture prior to the extraction. The analysis of the spent acid from Experiment III shows the final equivalent acidity to be about 95% while that from Experiment IV is about 86%.

Obviously, many modifications and variations of the invention, as hereinbefore set forth, may be made without departing from the spirit and scope thereof, and therefore only such limitations should be imposed as are indicated in the appended claims.

I claim:

1. A process for alkylating isoparaffin with olefin-based material which comprises:

alkylating said isoparaffin with olefin and alkyl sulfate in the presence of a sulfuric acid alkylation catalyst in an alkylation zone and withdrawing used sulfuric acid alkylation catalyst containing alkylation contaminants from said alkylation zone, reacting olefin in an olefin feed with said withdrawn used sulfuric acid alkylation catalyst in an absorption zone thereby effecting formation of an absorption effluent acid phase comprising alkyl acid sulfate, dialkyl sulfate and alkylation contaminants, extracting said absorption effluent acid phase with isobutane thereby effecting formation of a solution of dialkyl sulfate in isobutane and a spent acid comprising alkylation contaminants and alkyl acid sulfate, separating said solution of dialkyl sulfate in isobutane from said spent acid and passing said solution to said alkylation zone, diluting said separated spent acid with water to an equivalent acidity in the range of from about 50 percent to about 85 percent by weight without significant alcohol formation by hydrolysis, recovering olefin from said diluted spent acid leaving a treated dilute spent acid, and passing said recovered olefin to said alkylation zone.

2. The process of claim 1 in which the said olefin feed contacted with said used sulfuric acid alkylation catalyst comprises propylene.

3. The process of claim 1 in which the said olefin feed contacted with said used sulfuric acid alkylation catalyst comprises n-butylenes.

4. The process of claim 1, in which olefin is recovered from said diluted spent acid by heating.

5. The process of claim 1 in which olefin is recovered from said diluted spent acid by heating to a temperature in the range of 75 to 320° F.

6. The process of claim 1 in which said olefin is recovered from said diluted spent acid by extraction with isobutane.

7. The process of claim 6 in which said extraction with isobutane is conducted at a temperature above about 75° F.

8. The process of claim 1 in which said treated dilute spent acid is further diluted with water in an amount sufficient to form an acidic phase and oil phase without significant hydrolysis occurring, and separating said oil phase from said acidic phase.

9. A process of claim 8 in which said further dilution of said treated dilute spent acid is with sufficient water to result in said acidic phase having an equivalent acidity of about 50% by weight.

10. A process of claim 9 in which said acidic phase has an oil content of less than about 2% by weight.

11. A process for alkylating isoparaffin with olefin-based material which comprises:

alkylating said isoparaffin with an olefin and alkyl sulfate in the presence of a sulfuric acid alkylation catalyst in an alkylation zone and withdrawing used sulfuric acid alkylation catalyst containing alkylation contaminants from said alkylation zone, reacting olefin in an olefin feed with said withdrawn used sulfuric acid alkylation catalyst in an absorption zone thereby effecting formation of an absorption effluent acid phase comprising alkyl acid sulfate, dialkyl sulfate and alkylation contaminants, diluting said absorption effluent acid phase with water in an amount equal to about 3 to 7% by weight thereof without substantial hydrolysis occurring, extracting said diluted acid phase with isobutane in the liquid phase thereby effecting formation of an isobutane-dialkyl sulfate phase and a spent acid comprising alkylation contaminants and alkyl acid sulfate, and passing said isobutane-dialkyl sulfate phase to said alkylation zone.

12. The process of claim 11 in which said water is added in an amount to said absorption effluent acid phase to result in essentially complete extraction of dialkyl sulfate when said diluted acid phase is contacted with isobutane.

13. A process for alkylating isoparaffin with olefin-based material which comprises:

alkylating said isoparaffin with olefin and alkyl sulfate in the presence of a sulfuric acid alkylation catalyst in an alkylation zone and withdrawing used sulfuric acid alkylation catalyst containing alkylation contaminants from said alkylation zone, reacting olefin in an olefin feed with said withdrawn used sulfuric acid alkylation catalyst in an absorption zone thereby effecting formation of an absorption effluent acid phase comprising alkyl acid sulfate, dialkyl sulfate and alkylation contaminants, extracting said absorption effluent acid phase with isobutane thereby effecting formation of a first isobutane-dialkyl sulfate phase and a first spent acid comprising alkylation contaminants and alkyl acid sulfate, separating said isobutane-dialkyl sulfate phase from said spent acid and passing said first isobutane-dialkyl sulfate phase to said alkylation zone, diluting said spent acid with water to an equivalent acidity of about 85–90%, without substantial hydrolysis and extracting said diluted spent acid with isobutane in the liquid phase thereby effecting formation of a second isobutane-dialkyl sulfate phase and a second spent acid comprising alkylation contaminants and alkyl acid sulfate and passing said second isobutane-dialkyl sulfate phase to said alkylation zone.

References Cited
UNITED STATES PATENTS

| | | | |
|---|---|---|---|
| 3,227,774 | 1/1966 | Goldsby | 260—683.62 |
| 2,511,810 | 6/1950 | Arnold | 260—683.61 |

DELBERT E. GANTZ, Primary Examiner

G. J. CRACANAKIS, Assistant Examiner

U.S. Cl. X.R.

260—683.61

PO-1050 (5/69)

UNITED STATES PATENT OFFICE
CERTIFICATE OF CORRECTION

Patent No. 3,462,512　　　　　　　Dated August 19, 1969

Inventor(s) Arthur R. Goldsby

It is certified that error appears in the above-identified patent and that said Letters Patent are hereby corrected as shown below:

Drawing, line 1, cancel "E" as the middle initial of the inventor's name, insert -- R -- in lieu thereof. COLUMN 1, line 4, cancel "E" as the middle initial of the inventor's name and insert -- R -- in lieu thereof.

SIGNED AND
SEALED
DEC 15 1970

(SEAL)
Attest:

Edward M. Fletcher, Jr.
Attesting Officer

WILLIAM E. SCHUYLER, JR.
Commissioner of Patents